US005427481A

United States Patent [19]

Selb et al.

[11] Patent Number: 5,427,481

[45] Date of Patent: Jun. 27, 1995

[54] TOOL BIT AND TOOL BIT CHUCK FOR HAND TOOLS

[75] Inventors: Michael Selb, Feldfirch, Austria; Heinrich Pauli, Germering; Axel Neukirchen, Munich, both of Germany

[73] Assignee: Hilti Aktiengesellschaft, Fürstentum, Liechtenstein

[21] Appl. No.: 206,064

[22] Filed: Mar. 4, 1994

[30] Foreign Application Priority Data

Mar. 6, 1993 [DE] Germany ........................ 43 07 161.9
Apr. 26, 1993 [DE] Germany ........................ 43 13 578.1

[51] Int. Cl.⁶ ........................ B23B 51/02; B23B 31/02
[52] U.S. Cl. .................................. 408/226; 279/19.3; 408/240
[58] Field of Search ............... 408/226, 240, 227, 230; 279/19, 19.3, 19.4, 19.5

[56] References Cited

U.S. PATENT DOCUMENTS

| | | | |
|---|---|---|---|
| 2,393,424 | 1/1946 | Selch | 408/226 |
| 4,107,949 | 8/1978 | Wanner et al. | 408/226 |
| 5,174,698 | 12/1992 | Obermeier | 408/226 |
| 5,286,145 | 2/1994 | Kleine | 408/226 |
| 5,324,145 | 6/1994 | Kleine | 408/240 |

*Primary Examiner*—Daniel W. Howell
*Attorney, Agent, or Firm*—Anderson Kill Olick & Oshinsky

[57] ABSTRACT

A tool bit to be inserted into a tool bit chuck of a hand tool used for chiseling, drilling and/or percussion drilling has an axially extending chucking shank (A) with two locking grooves (1) closed at the ends spaced apart in the axial direction, and two rotary entrainment grooves (2) open at a free end of the shank. In addition, two rotary entrainment faces (3) are located in the areas of the locking grooves (1).

16 Claims, 7 Drawing Sheets

TOOL BIT AND TOOL BIT CHUCK FOR HAND TOOLS

BACKGROUND OF THE INVENTION

The present invention is directed to a tool bit to be inserted into a tool bit chuck for hand tools used for chiseling, drilling and/or rotary percussion drilling. The tool bit has a circular chucking shank with at least one axially extending locking groove closed at its ends spaced apart in the axial direction and at least one rotary entrainment groove open at a free end of the shank.

Tool bits and tool bit chucks are disclosed in DE-PS 25 51 125 in which the chucking shank of the tool bit has one or two axially extending locking grooves closed in the axial direction as well as one or two rotary entrainment grooves open towards the free end of the chucking shank. The tool bit chuck is arranged to receive the tool bit and has radially displaceable locking members corresponding to the number of locking grooves, and the locking members are in the shape of balls or spheres. The locking members in cooperation with the locking grooves prevent the tool bit from falling out of the tool bit chuck. The locking members can be radially displaced, shifting out of the locking grooves, so that the tool bit can be removed from the chuck.

No particularly high loads are applied to these locking grooves and cooperating locking members, since, in operation, the tool bit positioned in the tool bit chuck is for all intents and purposes supported floatingly relative to the locking members, whereby the locking members do not transmit any forces worth mentioning when they cooperate with the locking grooves. It is only when the tool bit is pulled out of a borehole in a structural component that the locking members in cooperation with the locking grooves must assure the connection between the tool bit and the tool bit receptacle.

Very high loads are developed in the axially extending rotary entrainment grooves open at the free end of the chucking shank which engage corresponding rotary entrainment members or strips in the tool bit chuck. The rotary entrainment grooves along with the rotary entrainment members or strips carry the entire torque transmitted during operation of the tool.

The weakness of these known tool bits and tool bit chucks is the amount of wear of the rotary entrainment grooves and the rotary entrainment members or strips, especially at the flanks on the entrainment side, whereby an extraordinarily high wear occurs at the flank located upstream in the direction of rotation but facing away from the direction of rotation. The cause of such wear is the high torque transmitted and the continuous relative offset of the flanks of the rotary entrainment grooves against the flanks of the rotary entrainment members. This offset relationship occurs in particular from the effect of percussion or shock loads acting on the tool bit during chiseling or percussion drilling operations. Since such wear results in the rotary entrainment grooves in the tool bit being beaten or crushed to such an extent that a reliable torque transmission is no longer possible before the normal wear under proper operation in the working range of the tool bit takes place. Such wear results in the expensive replacement of the tool bit.

SUMMARY OF THE INVENTION

Therefore, the present invention provides a tool bit evidencing no harmful wear in cooperation with a suitable tool bit chuck, so that reliable torque transmission is assured.

In accordance with the present invention, the chucking shank has, at least in the outer peripheral region of the locking grooves, a rotary entrainment face extending parallel to the axis of the chucking shank and extending to the free end of the shank.

The rotary entrainment face of the invention affords an additional face for transmitting torque while avoiding any cross-sectional weakening of the shank with its harmful effects upon the tool bit strength. Since the rotary entrainment face forms an area including the locking groove of the chucking shank, there is no reduction of the rotary entrainment groove. The flanks of the rotary entrainment groove serving for the transmission of torque and extending essentially radially are maintained in their full size. In addition, at least a portion of the locking groove is maintained intact in the chucking shank by the arrangement of the rotary entrainment face. The stop face in the locking groove for axial retention of the tool bit diminishing due to the arrangement of the rotary entrainment face is large, however, the connection between the tool bit and the tool bit chuck is assured by the cooperation of the locking member and the locking groove when the tool bit is pulled out of a borehole in a component.

Preferably, the rotary entrainment face is planar. Planar faces have the advantage that they can be produced in an easy and simple manner.

It is advantageous to provide the rotary entrainment face with a convex shape to attain a rotary entrainment face with a surface as large as possible. The cross-section of a chucking shank is only slightly weakened by the use of a convex rotary entrainment face and the stop face of the locking grooves for axially retaining the tool bit becomes only slightly smaller. It is also possible to provide a concave rotary entrainment face. Forces applied upon the convex or concave rotary entrainment face, which are necessary for offsetting the tool in the rotary direction act on a larger surface. Accordingly, a lower surface pressure is achieved, which has an extremely positive effect on the wear behavior of the chucking shank.

To avoid any reduction in the size of the area of the rotary entrainment surfaces cooperating with the locking elements in the tool chuck, in a preferred arrangement, the rotary entrainment surface is formed of two partial surfaces extending outwardly in a peak or ridge-like manner. An optimum size of the rotary entrainment surfaces is achieved when the fixed apex of the partial faces is located on the circular periphery of the chucking shank.

The partial surfaces can have different sizes and different apex angles depending upon the magnitude of the torque being transmitted. An apex angle between 120° and 150° has been shown to be satisfactory in view of the moments to be experienced.

The required rotary entrainment grooves and locking grooves represent a cross-sectional weakening of the chucking shank. To limit the additional weakening between the rotary entrainment grooves and locking grooves, it is advantageous if the rotary entrainment face or surface is disposed, relative to the locking groove, so that the rotary entrainment surface and the locking groove have coinciding axes of symmetry.

To carry a very high torque not acting on one side of the chucking shank of the tool bit, advantageously the chucking shank has two locking grooves located diametrically opposite one another and two rotary entrainment faces. The rotary entrainment faces extend parallel to one another. Accordingly, the two rotary entrainment faces and the entrainment side flanks of the rotary entrainment grooves which extend essentially radially, serve for transmitting the torque.

The rotary entrainment faces are arranged symmetrically, whereby the torque is distributed in an even manner on the periphery of the chucking shank.

Preferably, the rotary entrainment faces are arranged so that the length of the rotary entrainment face is greater than the corresponding length of the locking groove, whereby the rotary entrainment face can carry as large a share of the torque as possible. The regions of the rotary entrainment faces projecting beyond the locking grooves in the axial direction, serve with their entire surface for transmitting torque.

The previously mentioned tool bits have the advantage that they can be used in a conventional tool bit chuck, such as one corresponding to that in DE-PS 25 51 125. However, a loss must be accepted, since increased shares of the torque cannot be transmitted, and the rotary entrainment faces have no functional purpose. The circularly-shaped receiving bore of such a tool chuck has at least one rotary entrainment ledge or strip for the a rotary entrainment groove and at least one radially displaceable locking member for locking groove in the tool bit. An increase of the torque to be transmitted can be achieved if the tool bit is inserted into a tool bit chuck in accordance with the present invention with the receiving bore preferably including, in the region or the locking member, at least one counter of opposite face for the rotary entrainment face of the tool bit.

By an appropriate counter face in the tool bit chuck matched to the rotary entrainment face on the tool bit, an additional torque transmission from the tool bit chuck to the chucking shank of the tool bit is possible not only through the rotary entrainment strip in connection with the rotary entrainment groove, but also through the counter face cooperating with the rotary entrainment face.

Preferably, the counterface is planar. Planar surfaces can be simply and economically manufactured.

To provide a receiving bore with a counter face which is as large as possible, preferably the counterface is concave. The cross-section of the receiving bore is reduced by the arrangement of a concave counter face and the wall thickness of the tool bit shank increases in the region of the counter faces. As a result, an overall stable tool bit chuck is obtained. The receiving bore can also be shaped so that the counter face in the receiving bore is advantageously provided with a convex shape. Concave as well as convex counter faces are particularly suitable for transmitting high forces, which are required for driving the tool bit in a rotary direction, since the forces are distributed across a larger surface. This results in a lower specific surface pressure and has a positive effect on the wear behavior of the tool bit chuck.

To adequately secure the tool bit, for instance in the case of no load blows or strokes, preferably a counter face is formed of two partial faces extending toward each other and projecting outwardly to a ridge or peak. This arrangement affords a sufficiently large stop with the locking members of the tool bit chuck. Preferably, the ridge or apex of the partial surfaces is located on the circular contour of the receiving bore and, in addition, an apex angle between 120° to 150° has been found to be especially favorable.

The guide of the tool bit chuck has a basically radially extending through opening for receiving the locking member and through which the locking member can be radially displaced. It is advantageous if the locking member and the counter face are disposed in such a way that they have coinciding axes of symmetry for creating a greater wall thickness in the region of the through opening for the locking member.

In a preferred embodiment, the tool bit chuck has two locking members located diametrically opposite one another and two counter faces also located diametrically opposite one another. Such a tool bit chuck is especially suited for transmitting high torques, since two counter faces are provided in addition to the rotary entrainment strips. The driving force is thus divided, so that a lower specific surface pressure is established between the individual surfaces cooperating with one another.

The counter faces of the tool bit chuck can be arranged symmetrically, so that the forces developed in the course of torque transmission engage at the chucking shank of the tool bit and are uniformly distributed around its peripheral surface. Accordingly, the torque transmission is effected by the rotary entrainment strips in connection with the rotary entrainment grooves and the counter faces in connection with rotary entrainment faces.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

FIGS. 1–4 and 6, 7 show, respectively, an axially extending chucking shank A, B, C, D of a tool bit. The chucking shank A, B, C, D has two axially extending locking grooves 1, 11, 21, 31 closed at the ends spaced apart in the axial direction and two rotary entrainment grooves 2, 12, 22, 32 open at the free end of the chucking shank A, B, C, D. Flanks 2a, 2b, 12a, 12b, 22a, 22b, 32a, 32b of the rotary entrainment grooves 2, 12, 22, 32 extend essentially radially as can be noted in particular from FIGS. 2, 3, 4 and 7.

Figure 1:
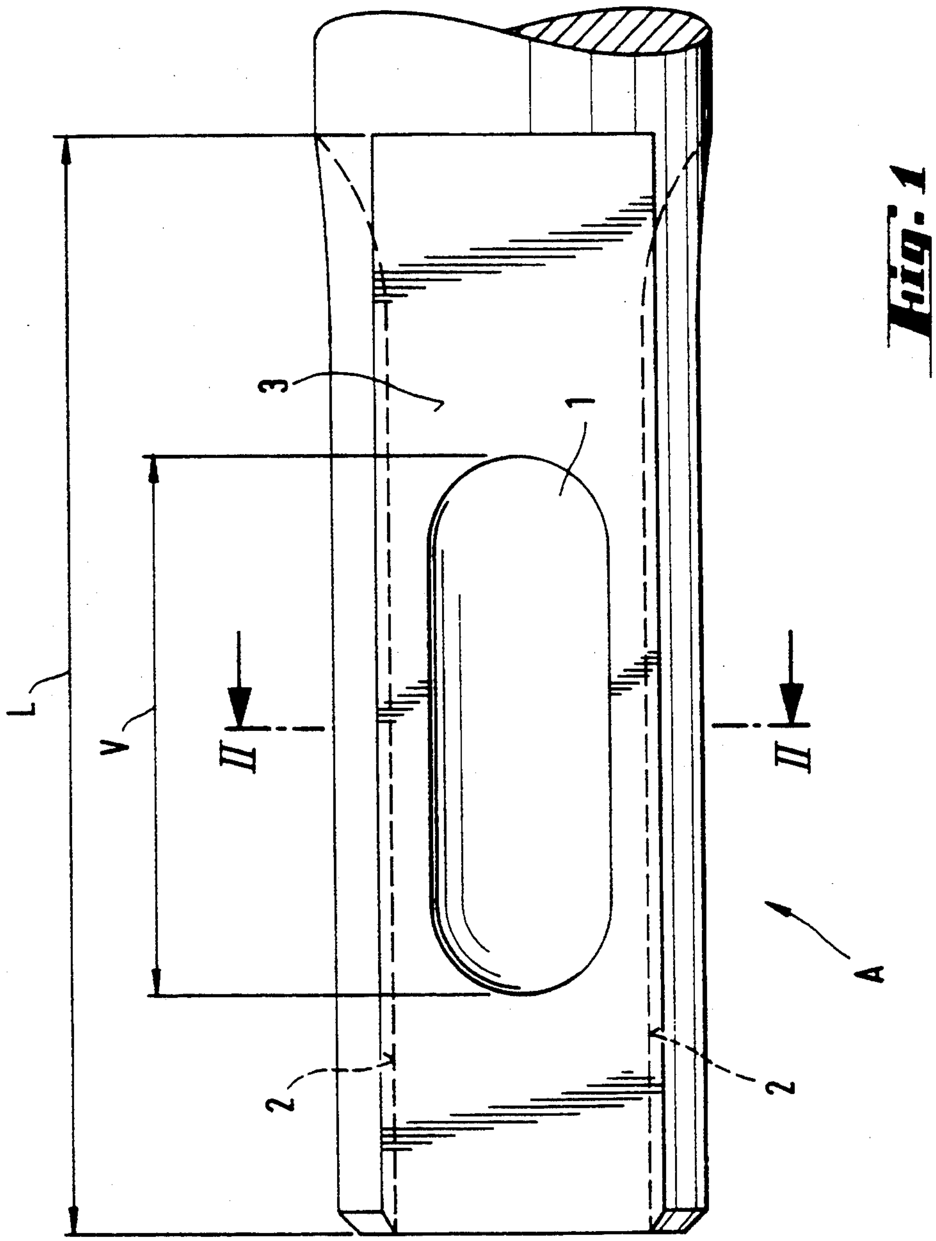
FIG. 1 is an axially extending side view of a tool bit chucking shank embodying the present invention.

As shown in FIG. 1, there is an axial length relationship between the length L of the rotary entrainment face 3 and the length V of the locking groove 1. The regions of the rotary entrainment face 3 extending axially beyond the locking groove 1 serve for transmitting torque with their entire surface.

Figure 2:
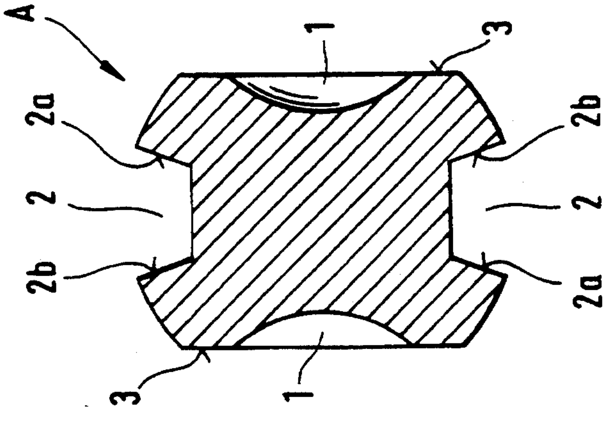
FIG. 2 is a sectional view of the chucking shank in FIG. 1 taken along the II—II.

Chucking shank A has two symmetrically arranged rotary entrainment faces 3 extending parallel to one another, as shown in FIG. 2. These rotary entrainment faces 3 have a planar shape and extend in the axial direction of the chucking shank A.

Figure 3:
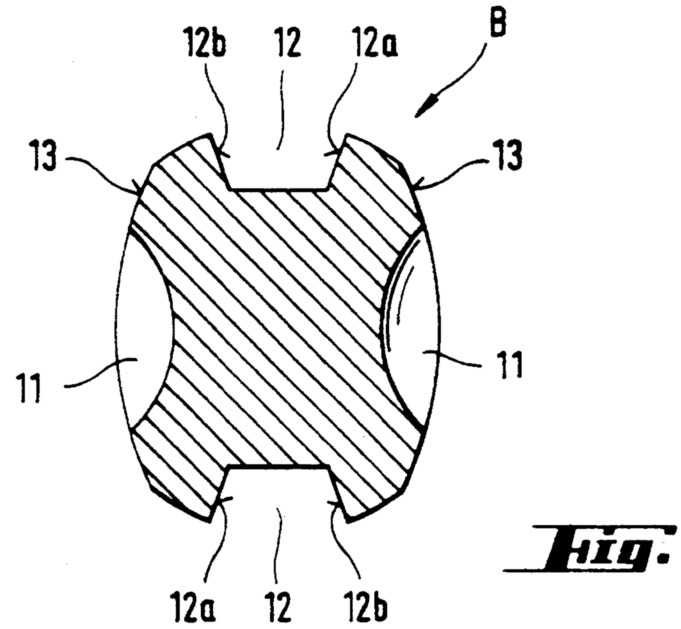
FIG. 3 is a sectional view, similar to FIG. 2, of another chucking shank.

The chucking shank B in FIG. 3 has two symmetrical convexly shaped rotary entrainment faces 13. These rotary entrainment faces extend in the axial direction of the chucking shank. The locking grooves 1 and rotary entrainment faces 13 have coinciding axes of symmetry.

Figure 4:
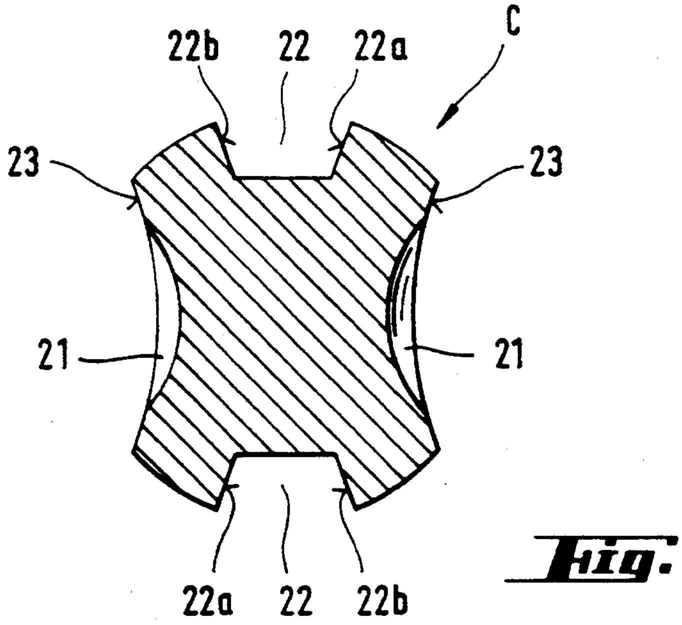
FIG. 4 is a cross-sectional view, also similar to FIG. 2, of a further chucking shank.

FIG. 4 illustrates a chucking shank C with two symmetrical concavely shaped rotary entrainment faces or surfaces 23 extending in the axial direction of the clamping shank C. Locking grooves 21 and the rotary entrainment faces 23 have coinciding axes of symmetry.

Figure 5:
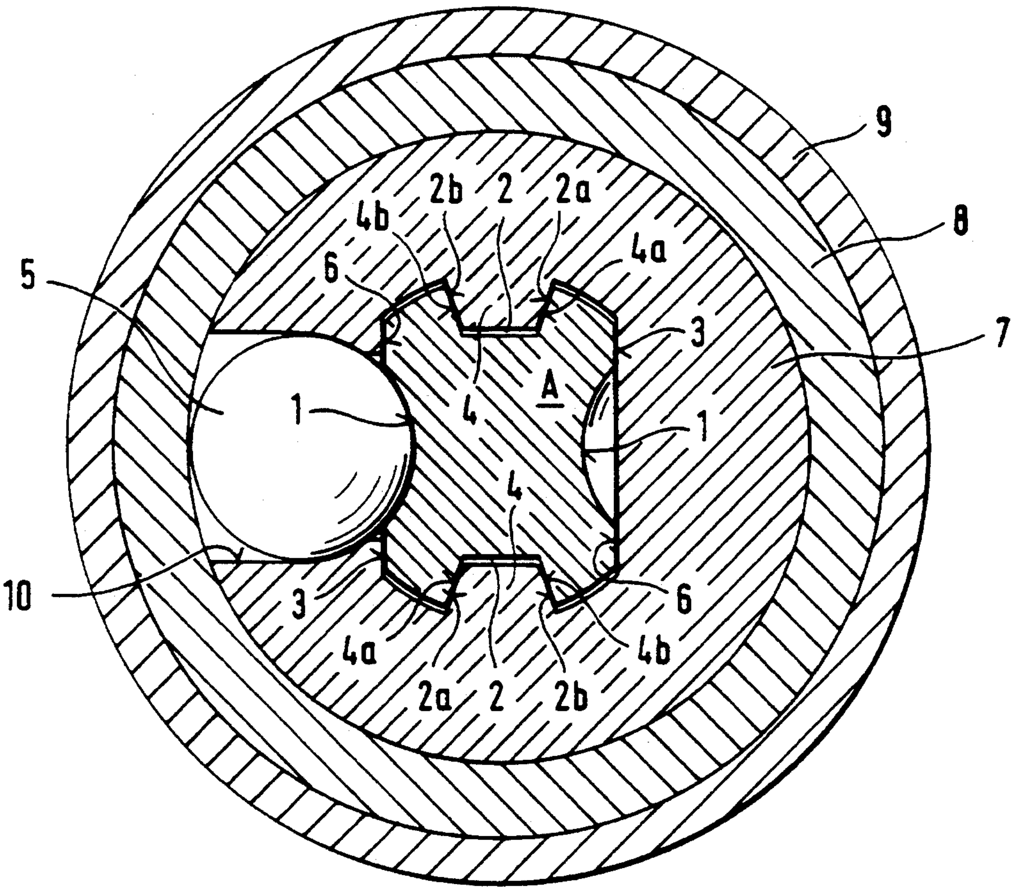
FIG. 5 is a sectional view through a tool bit chuck securing the chucking shank as shown in FIGS. 1 and 2.

FIG. 5 shows diagrammatically a transverse sectional view through a tool bit chuck into which the chucking shank A of the tool bit displayed in FIGS. 1 and 2, with locking grooves 1, rotary entrainment grooves 2 and rotary entrainment faces 3, is inserted. The tool bit chuck has a guide member 7 in which the chucking shank is seated, an actuation sleeve 8 encircling the guide member, and a cage 9 encircling and embracing the radially outer surface of the actuation sleeve 8. By displacing the actuation sleeve 8 in the axial or circumferential direction a recess, not illustrated, can be moved into radial alignment with the locking member 5, whereby the locking member, displaceable in a radially extending through opening 10 in the guide member 7, can move radially outwardly out of the locking groove 1, so that the chucking shank A is released and can be removed from the a guide member 7 and, therefore, the tool bit can be removed from the tool bit chuck. The guide member 7 has axially extending rotary entrainment strips 4 having flanks 4a, 4b extending basically radially as can be seen in FIG. 5 extending into the rotary entrainment grooves 2. The guide member 7 has a receiving aperture which in the region of the locking member 5 has at least one matching planar face 6 for the rotary entrainment face 3 of the chucking shank A.

Figure 6:
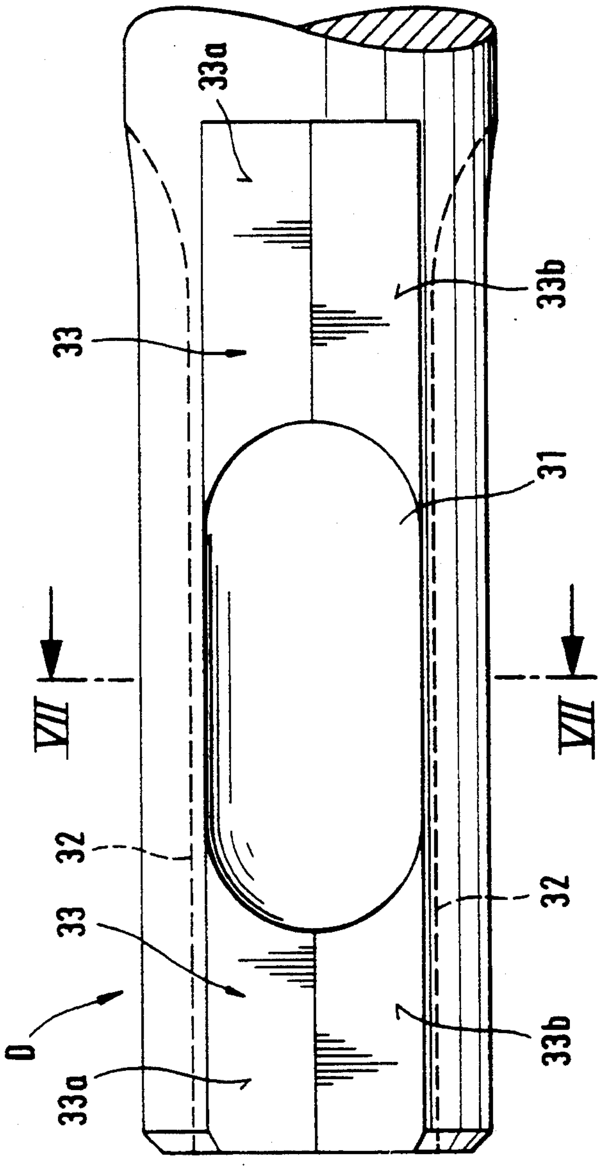
FIG. 6 is an axially extending view, such as shown in FIG. 1, of yet another chucking shank.
Figure 7:
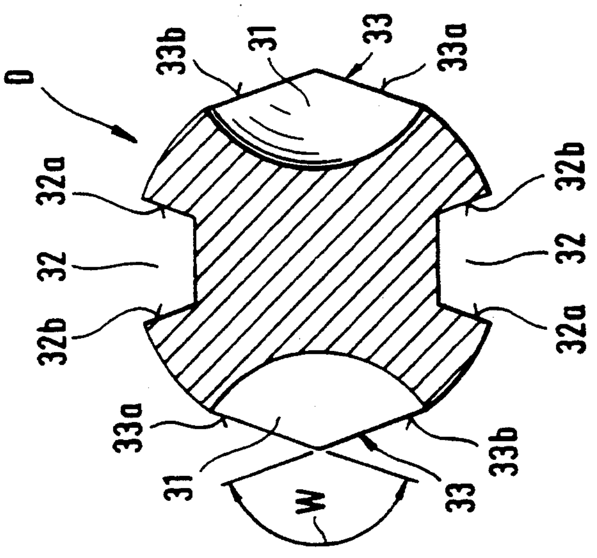
FIG. 7 is a cross-sectional view of the chucking shank in FIG. 6 taken along the line VII—VII.

The chucking shank D shown in FIG. 6 has a rotary entrainment surface 33 formed by two partial surfaces 33a, 33b with the surfaces projecting outwardly in a roof-like manner forming a ridge or peak. The partial surfaces project in both the axial and circumferential directions of the chucking shank from the locking groove 31. The portions of the partial surfaces 33a, 33b projecting axially beyond both the ends of the locking groove 31, transmit torque with their entire surfaces. The partial surfaces 33a, 33b of the rotary entrainment surface 33, there is one on each side of the chucking shank as shown in FIG. 7, extend for a part of the axial length of the chucking shank D. The interior angle W of the partial surfaces 33a , 33b forming the roof-like surface is in the range of 120° to 150° .

The partial surfaces 33a, 33b are symmetrical to one another. The locking grooves 31 and the rotary entrainment faces 33 have coinciding axes of symmetry.

Figure 8:
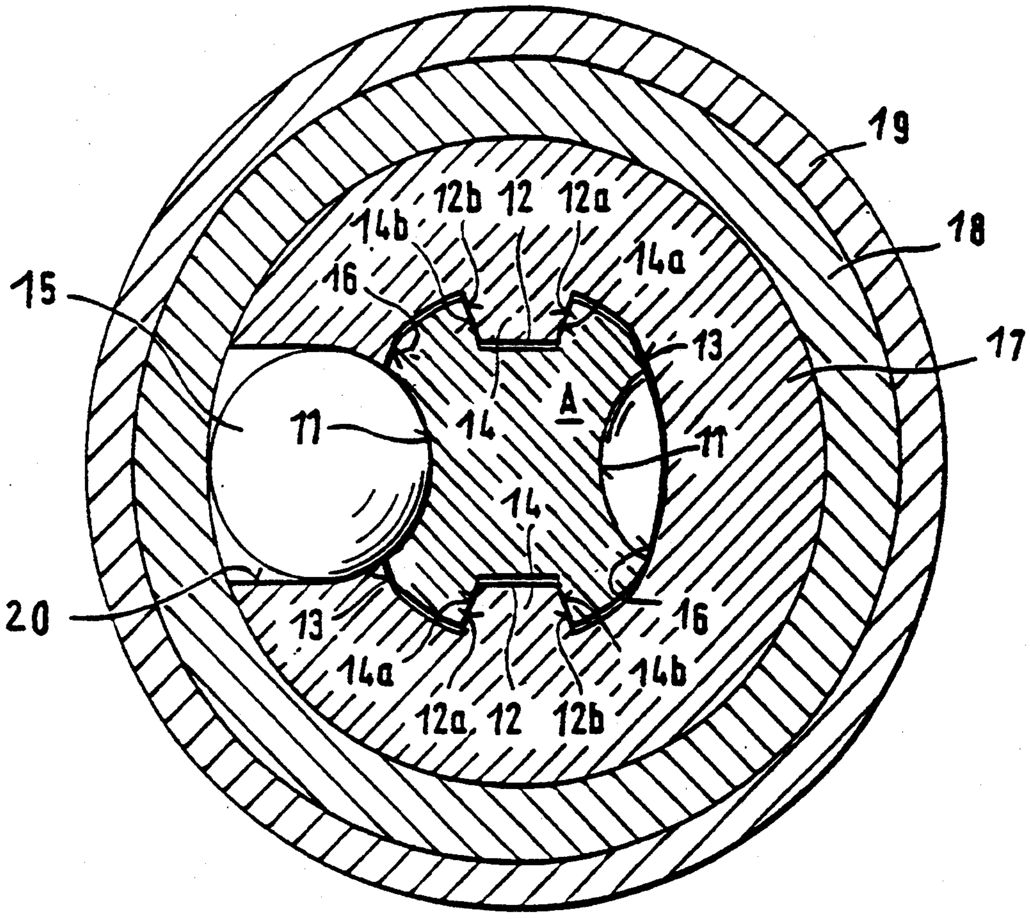
FIG. 8 is a cross-sectional view through a tool bit chuck securing the chucking shank shown in FIG. 3.

FIG. 8 is a diagrammatical showing of a tool bit chuck for the chucking shank B illustrated in FIG. 3 and having the locking groove 11, the rotary entrainment groove 12 and the rotary entrainment faces 13. The tool bit chuck has a guide 17 enclosed by an actuation sleeve 18 with a cage 19 laterally enclosing the actuation sleeve 18. By displacing the actuation sleeve 18 in the axial or circumferential direction, a recess, not shown, can be aligned radially outwardly from the locking member, whereby the locking member can be displaced through a radially extending throughbore 20 out of the locking groove 11 effecting the release of the chucking shank B, so that the chucking shank B of the tool bit can be removed from the guide 17 with the tool bit removed from the tool bit chuck.

As shown in FIG. 8, the guide 17 has axially extending rotary entrainment strips 14 provided with substantially radially extending flanks 14a, 14b.

Guide 17 has a receiving aperture which in the axially extending region of the locking member 15 has at least one concave counter face 16 for the rotary entrainment face 13 of the tool bit.

Figure 9:
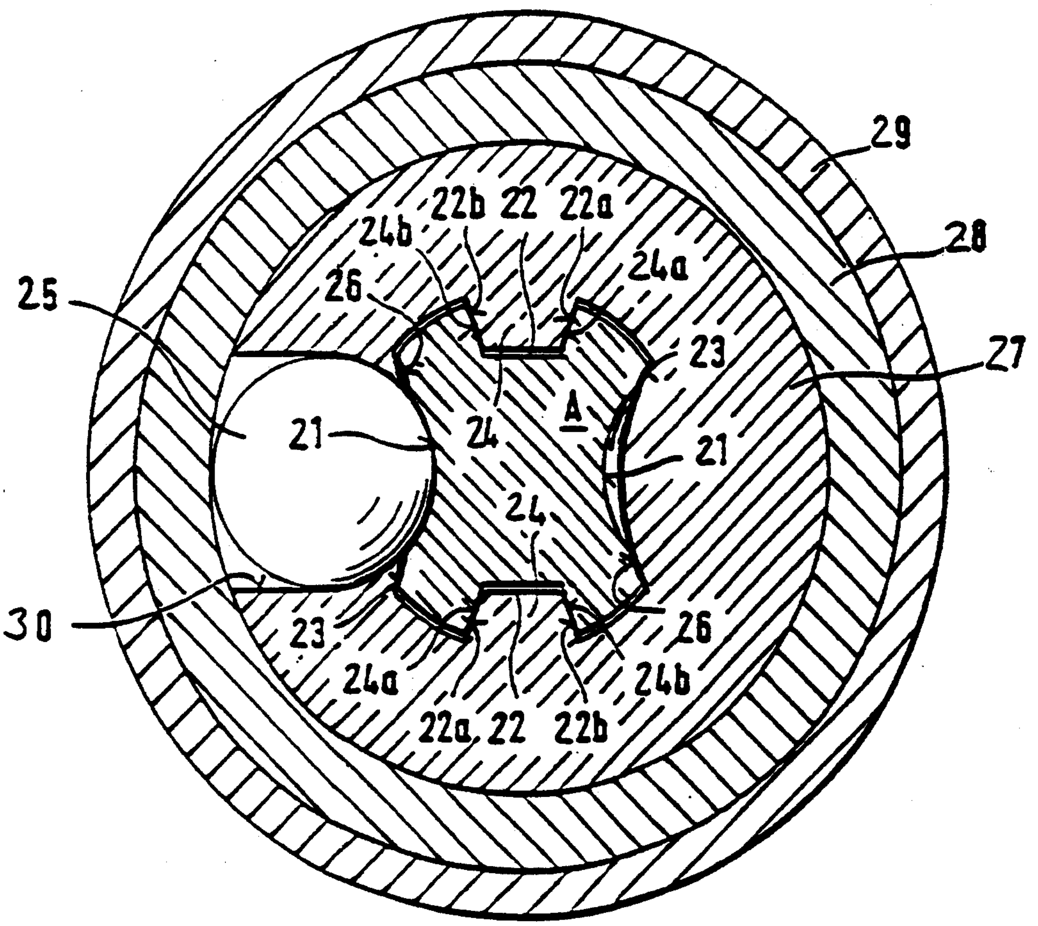
FIG. 9 is a sectional view through a tool bit chuck securing the chucking shank shown in FIG. 4.

FIG. 9 is a diagrammatical showing of a tool bit chuck for the chucking shank C of the tool bit illustrated in FIG. 4 and which has locking grooves 21, rotary entrainment grooves 22 and rotary entrainment faces 23. The tool bit chuck has a guide 27 into which the chucking shank is inserted, an actuation sleeve enclosing the guide 27 and a cage 29 embracing the outside surface of the actuation sleeve 28. By displacing the actuation sleeve 28 in the axial or circumferential direction, a recess, not shown, can be aligned radially outwardly from the locking member 25, so that the locking member 25 can be displaced through a radially extending throughbore 30 and shifted out of the locking groove 21 releasing the chucking shank C, whereby the chucking shank C and the tool bit can be removed from the guide 27 in the chuck.

Further, in FIG. 9 the guide 27 has rotary entrainment strips 24 provided with substantially radially extending flanks 24a, 24b.

Guide 27 has a receiving aperture for the chucking shank C and the aperture has at least one convex counter face 26 for the rotary entrainment face 23 of the chucking shank in the region of the locking member 25.

Figure 10:
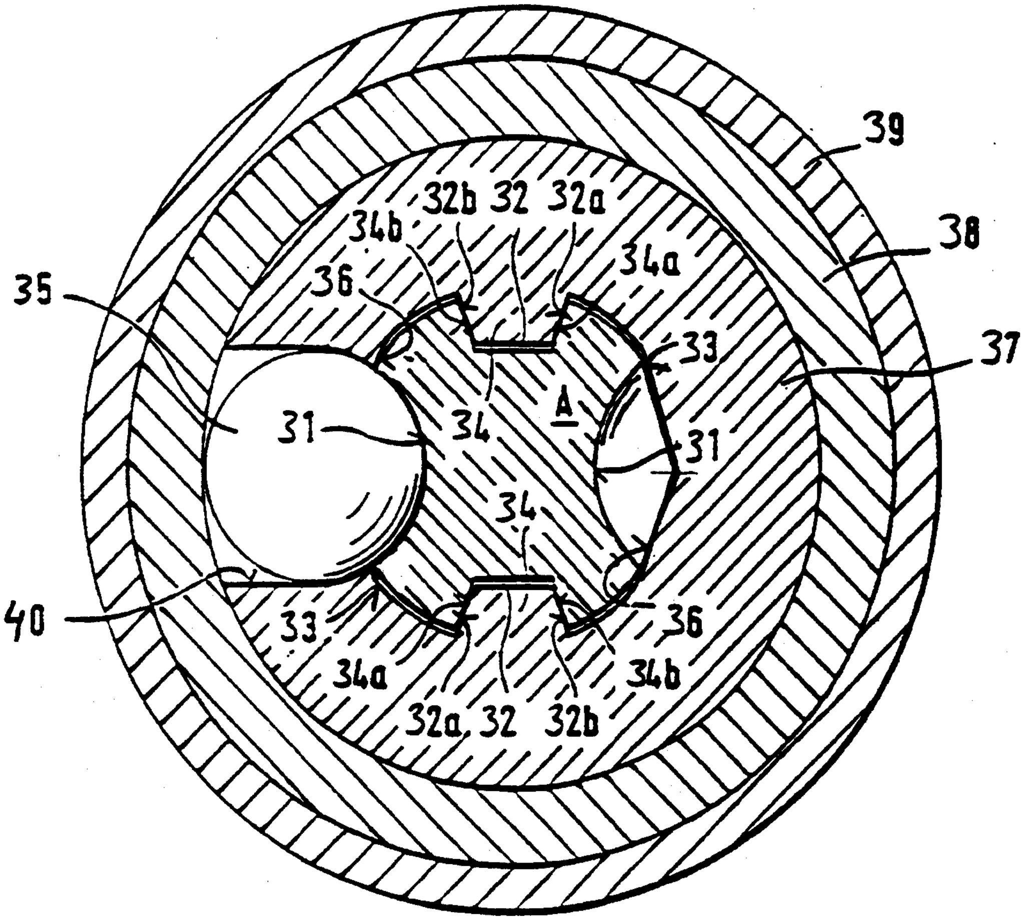
FIG. 10 is a sectional view through a tool bit chuck securing the chucking shank shown in FIGS. 6 and 7.

In FIG. 10 a tool bit chuck is shown diagrammatically with the chucking shank D of the tool bit as shown in FIG. 7 with the chucking shank having a locking groove 31, rotary entrainment grooves 32 and rotary entrainment surfaces 33. The tool bit chuck includes a guide 37, an actuation sleeve 38 encircling the guide an a cage 39 laterally enclosing the actuation sleeve 38. By displacing the actuation sleeve 38 in the axial or circumferential direction, a recess, not shown, can be aligned in the radial direction with the locking member, whereby the locking member is displaceable in a radially extending throughbore 40 so that it can move outwardly out of the locking groove 31 and release the chucking shank D for removing the chucking shank D and the tool bit out of the guide 37 and out of the chuck.

As displayed in FIG. 10, the guide 37 has rotary entrainment strips 34 provided with substantially radially extending flanks 34a, 34b.

Guide 37 has a receiving aperture containing at least one counter face 36 made up of two partial faces formed in a roof-shaped manner and located in the axially extending region of the locking member 35 for cooperation with the rotary entrainment surface 33 on the tool bit chucking shank.

While a specific embodiment of the invention has been shown and described in detail to illustrate the inventive principles, it will be understood that the invention may be embodied otherwise without departing from said principles.

We claim:

1. Tool bit to be inserted into a tool bit chuck in a hand tool used for chiseling, drilling and/or percussion drilling comprises an axially extending circular chucking shank (A, B, C, D) having a free end and at least one axially extending locking groove (1, 11, 21, 31) closed at opposite ends thereof spaced apart in the axial direction and at least one axially extending rotary entrainment groove open at the free end of said shank, wherein the improvement comprises that said shank (A, B, C, D) has in a circumferentially and axially extending area containing said locking groove (1, 11, 21, 31) a rotary entrainment face (3, 13, 23, 33) extending to the free end of said shank and extending parallel to the axis of said shank (A, B, C, D).

2. Tool bit, as set forth in claim 1, wherein said rotary entrainment face (3) is planar.

3. Tool bit, as set forth in claim 1, wherein said rotary entrainment face (13) is convex.

4. Tool bit, as set forth in claim 1, wherein said rotary entrainment face (23) is concave.

5. Tool bit, as set forth in claim 1, wherein said rotary entrainment face (33) comprises two partial surfaces (33*a*, 33*b*), extending in a roof-like manner to an axially extending ridge-shaped peak.

6. Tool bit, as set forth in claim 5, wherein said ridge-like peak of said partial surfaces (33*a*, 33*b*) is located on the circular periphery of said chucking shank (D).

7. Tool bit, as set forth in claim 6, wherein said partial surfaces (33*a*, 33*b*) form an interior angle (W) in a range of 120° to 150°.

8. Tool bit, as set forth in one of claims 1 to 7, wherein said locking groove (1, 11, 21, 31) and said rotary entrainment face (3, 13, 23, 33) have coinciding axes of symmetry.

9. Tool bit, as set forth in claim 8, wherein said chucking shank (A, B, C, D) comprises two locking grooves (1, 11, 21, 31) disposed diametrically opposite one another and two rotary entrainment faces (3, 13, 23, 33).

10. Tool bit, as set forth in claim 9, wherein the axial length (L) of said rotary entrainment surfaces (3, 13, 23, 33) is greater than the axial length (V) of the locking groove (1, 11, 21, 31).

11. Tool bit chuck for a tool bit as set in one of claims 1 to 7, comprising an axially extending circular receiving bore, at least one axially extending rotary entrainment strip (4) projecting inwardly into said bore and arranged to fit into said rotary entrainment groove, and at least one radially displaceable locking member (5) arranged to engage in said locking groove (1), wherein the improvement comprises at least one counter face (6) corresponding to said rotary entrainment face (3) of said tool bit and containing said locking member (5).

12. Tool bit chuck, as set forth in claim 11, wherein said counter face (6) is planar.

13. Tool bit chuck, as set forth in claim 11, wherein said counter face is concave.

14. Tool bit chuck, as set forth in claim 11, wherein said counter face is convex.

15. Tool bit chuck, as set forth in claim 11, wherein said counter face consists of two partial surfaces disposed in a roof-like manner and forming an axially extending ridge.

16. Tool bit chuck, set forth in claim 11, wherein said locking member (5) and said counter face (6) have coinciding axes of symmetry.

* * * * *